United States Patent [19]

Rando

[11] 4,221,483
[45] Sep. 9, 1980

[54] LASER BEAM LEVEL INSTRUMENT

[75] Inventor: Joseph F. Rando, Cupertino, Calif.

[73] Assignee: Spectra-Physics, Inc., Mountain View, Calif.

[21] Appl. No.: 962,198

[22] Filed: Nov. 20, 1978

[51] Int. Cl.$^3$ .............................................. G01C 9/12
[52] U.S. Cl. ..................................... 356/250; 356/149
[58] Field of Search ................ 356/249, 250, 399, 149

[56] References Cited

U.S. PATENT DOCUMENTS

| | | | |
|---|---|---|---|
| 3,709,579 | 1/1973 | Makosch | 356/399 X |
| 3,771,876 | 11/1973 | Ljungdahl et al. | 356/250 X |
| 3,813,171 | 5/1974 | Teach et al. | 356/399 X |
| 3,936,197 | 2/1976 | Aldrink et al. | 356/250 |
| 4,062,634 | 12/1977 | Rando et al. | 356/149 X |

Primary Examiner—Edward S. Bauer
Assistant Examiner—Matthew W. Koren
Attorney, Agent, or Firm—Donald C. Feix

[57] ABSTRACT

A lightweight, portable laser beam level instrument has an optical path which includes a solid state light source; a pendulous, positive lens; a rotatable pentaprism or mirror equivalent; and a glass plate which is tilted to provide fine tuning. The level instrument also includes a damping mechanism, a waterproof enclosure and a clip-in battery pack.

The solid state light source is a diode in a specific embodiment and produces an intense beam of rapidly diverging infrared laser light.

The postiive lens is suspended below the diode at approximately the focal length of the lens from the diode to collimate the light. The pendulous suspension lens maintains the beam in a truly vertical position with respect to the earth to provide self-leveling in a limited range of movement of the instrument. The pentaprism or equivalent converts this vertical beam to a horizontal beam.

The glass plate is positioned between the diode and the lens and can be tilted in two orthogonal degrees of adjustment to provide a fine tuning for optical centering of the diode and the lens.

Oscillation of the pendulous lens is damped by magnetic or air damping.

21 Claims, 3 Drawing Figures

LASER BEAM LEVEL INSTRUMENT

BACKGROUND OF THE INVENTION

This invention relates to a laser beam level instrument of the kind used in surveying and in the construction industry. It relates particularly to a relatively lightweight, portable, self-contained level which can be carried by one man and which, in operation, functions to provide self-leveling within a certain range of angular tilting of the laser beam level instrument. The beam is subsequently detected by a portable electronic detector.

The laser beam level instrument of the present invention is constructed to be used as a replacement for optical and other automatic level instruments now used in construction.

Laser beam level instruments are instruments which sweep a laser beam in a horizontal plane and are used in surveying and in the construction industries. Tube type gas lasers are often used as the light source, and the output beam of the gas laser is usually aligned vertically and then deflected to the horizontal by rotating heads which sweep, or swing, the horizontal beam in a horizontal plane. U.S. Pat. No. 4,062,634 to Rando, el al. (and assigned to the same Assignee as the Assignee of this application) gives a detailed description of a prior art laser level which uses a gas laser tube as the light source.

A laser level should be capable of providing a certain amount of automatic self-leveling to maintain the beam in a horizontal plane after the laser beam level instrument is initially set up and turned on. The base or stand on which the instrument is supported in the field may be bumped or otherwise caused to shift to at least a slight amount in the course of operations, and self-leveling eliminates the need for an operator to manually readjust the level each time it gets such a slight bump or jar.

Automatic self-leveling also makes initial set-up faster since precise adjustments are not required for the initial set-up.

The helium-neon lasers used as the light source in prior art laser beam level instruments are relatively big and, as a result, the prior art laser levels have tended to be relatively large and heavy devices which required servomotors and large power packs to provide plasma tube power and the desired self-leveling. These prior art laser beam level instruments have often been too large to be carried by one person, and were also relatively expensive to manufacture and to buy.

SUMMARY OF THE INVENTION

It is a primary object of the present invention to construct a relatively lightweight, portable, self-contained laser beam level instrument which can be carried by one man and which is self-leveling within a certain range of movement of the instrument.

An important object is to construct an automatic leveling laser beam level instrument which can replace optical automatic level instruments and their functions.

The laser beam level instrument of the present invention eliminates plasma tubes and electric servomotors and the relatively large power supplies required in prior art laser beam level instruments and achieves a lightweight, compact construction by using a solid state light source and a pendulous, positive lens which is suspended beneath the solid state light source by a lightweight mechanical suspension effective to provide self-leveling within a limited range.

The power requirements of the present invention are relatively small so that the instrument is quite portable with a self contained battery pack.

In a particular embodiment of the present invention the solid state light source is a diode which produces an intense beam of infrared laser light. The beam of light emitted from the diode diverges rapidly, and a positive lens is positioned below the diode at the focal distance of the lens so that the diverging beam of light is imaged at infinity and is substantially collimated as the light beam leaves the lens.

The suspension includes a plurality of fine wires which suspend the positive lens in a pendulous mount below the diode and which permit the lens to shift to a truly vertical position beneath the diode under the influence of gravity in the event of a slight shift or tilt of the overall level after it has been started in operation. This suspension feature of the present invention also eliminates the need for precise leveling at the time of initial set-up of the instrument.

Undesired oscillation of the pendulous lens is restrained by an air or magnetic damping system.

A glass plate is interposed between the diode and the lens, and the glass plate is mounted on a carrier which is tiltable in two orthogonal degrees of adjustment to provide fine tuning for the optical centering of the lens with respect to the diode. This permits easy calibration of the laser beam level instrument in the field as well as at the time of assembly.

The laser beam level instrument of the present invention uses a rotatable pentaprism or an equivalent two mirror combination for deflecting the truly vertical beam to a truly horizontal beam and for swinging the horizontal beam to produce a truly horizontal plane (within the limits imposed by the rotating pentaprism or equivalent two mirror combination).

All of the operating parts of the laser beam level instrument are enclosed in a watertight lighthouse, and a rechargeable battery pack is incorporated in the laser beam level instrument as an integral part of the instrument. The battery is not in the waterproof portion and can be removed for charging.

The electrical control circuitry for the instrument incorporates a number of safety features. The laser is automatically shut off in the event the instrument is tilted to a position outside the self-leveling range. The power to the diode is also automatically shut off in the event that the rotatable pentaprism or mirror equivalent is stopped or is not rotating fast enough. This prevents exceeding a power density limit at a specific location which some consider might be an eye hazard. A high temperature shut-off is also preferably incorporated in the electrical control circuit to sense the temperature of the diode and to turn off the power to the diode in the event that the temperature of the diode gets into a range where the diode life could be limited by diffusion.

The control circuit also preferably includes a light output detector which detects the light output of the diode and which operates through a servo circuit to reduce the current to the diode to provide a constant output power for detection, to enhance life and to avoid optical damage to the diode.

Laser beam level apparatus and methods which incorporate the structure and techniques described above and which are effective to function as described above constitute specific objects of this invention.

Other and further objects of the present invention will be apparent from the following description and claims and are illustrated in accompanying drawings which, by way of illustration, show preferred embodiments of the present invention and the principles thereof and what are now considered to be the best modes contemplated for applying these principles. Other embodiments of the invention embodying the same or equivalent principles may be used, and structural changes may be made as desired by those skilled in the art without departing from the present invention and the purview of the appended claims.

DESCRIPTION OF THE PREFERRED EMBODIMENTS

Figure 1:
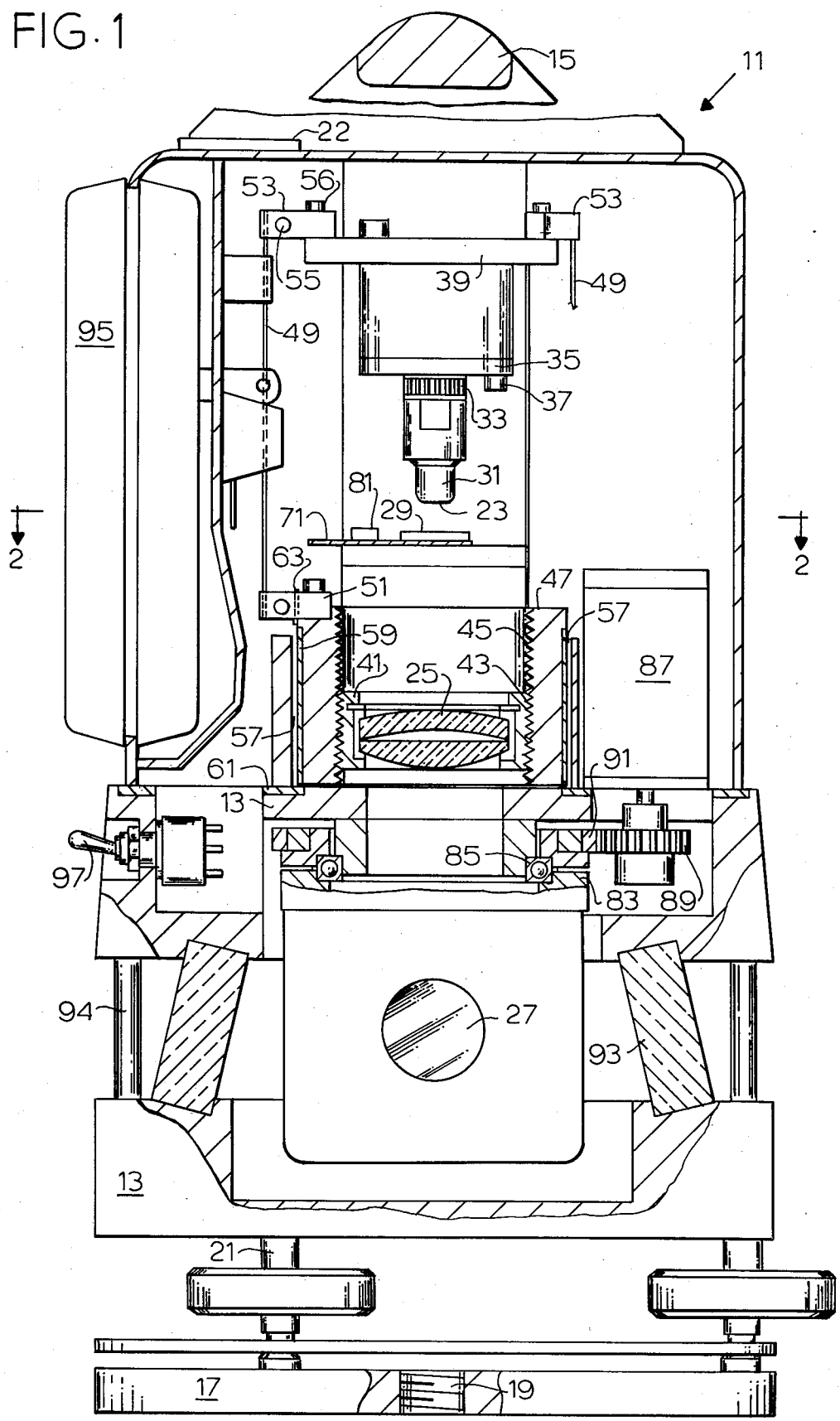
FIG. 1 is a side elevation view in cross section, taken generally along the line and in the direction indicated by the arrows 1—1 in FIG. 2, of a laser beam level instrument constructed in accordance with one embodiment of the present invention.
Figure 2:
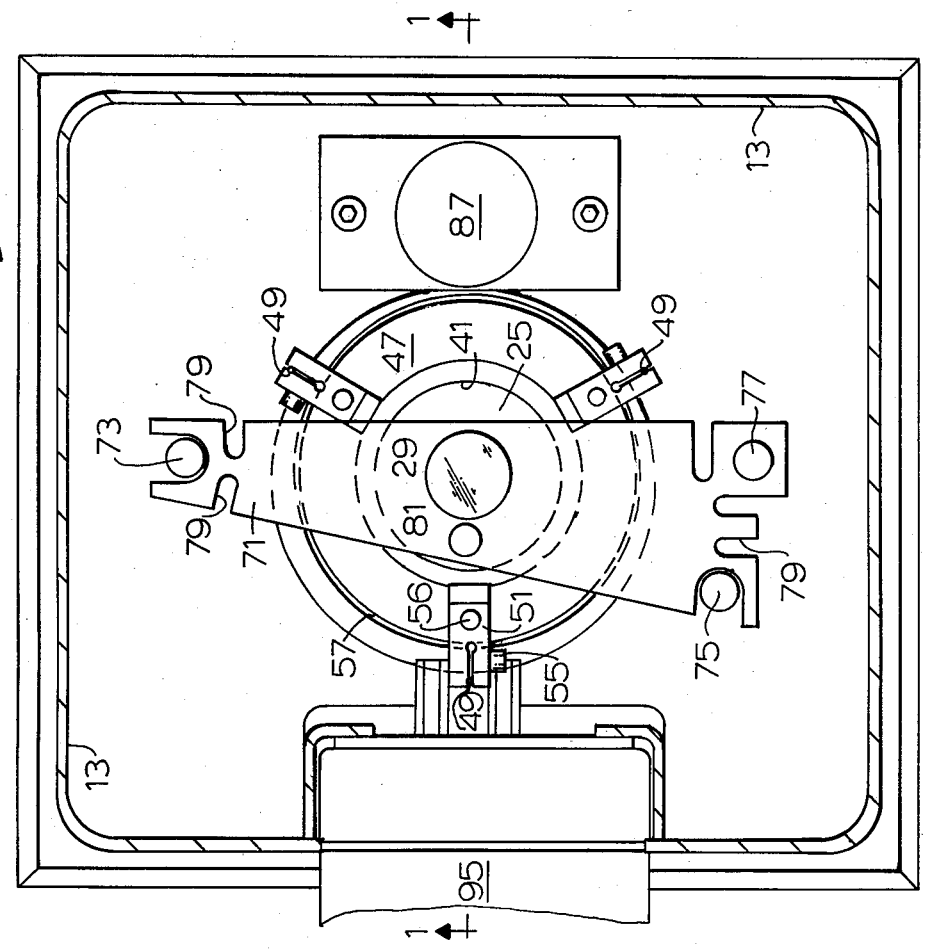
FIG. 2 is a top plan view in cross section of the instrument shown in FIG. 1 and is taken generally along the line and in the direction indicated by the arrows 2—2 in FIG. 1.
Figure 1:
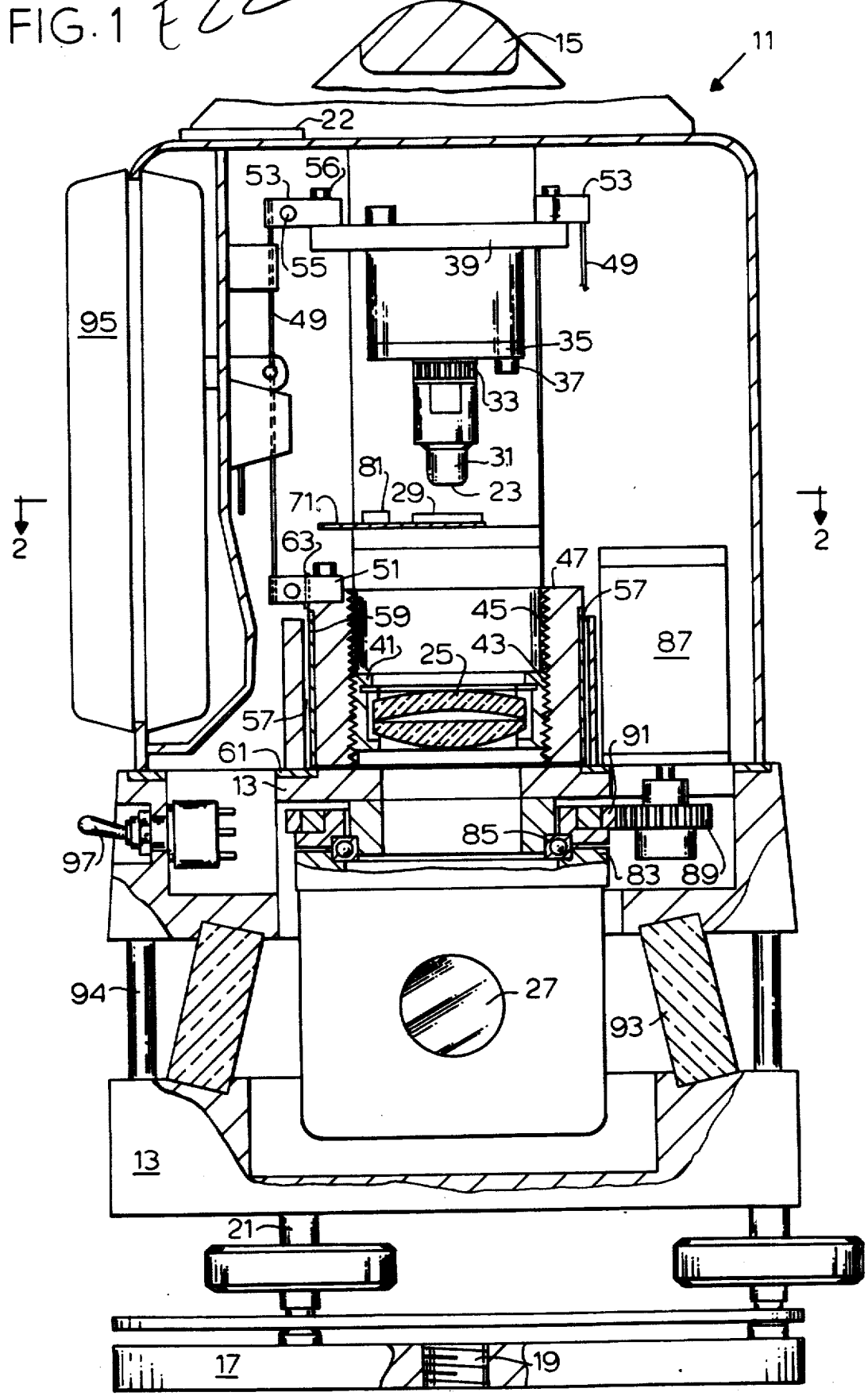

A laser beam level instrument constructed in accordance with one embodiment of the present invention is indicated generally by the reference number 11 in FIGS. 1 and 2.

The instrument 11 is constructed to be a relatively lightweight, portable, self-contained level instrument which can be carried by one man and which is self-leveling within a limited range of operation.

The instrument 11 has a main frame 13 with an upper handle 15 for carrying the instrument 11 from one job location to another.

The instrument 11 is mounted on top of a tripod by means of a base plate 17. A threaded opening 19 mounts the base plate 17 on the tripod.

Manually adjustable screws 21 provide the initial adjustment required to adjust the instrument 11 into the range of automatic leveling (which will be described in more detail below). Bubble levels 22 are used in conjunction with the adjustment of the screws 21 to get the instrument 11 into the range of automatic leveling.

The major components of the optical path of the instrument 11 include a solid state junction 23, a pendulous, positive lens 25, rotatable mirrors 27 and a glass plate 29 which can be tilted for fine tuning.

The solid state junction 23 produces an intense beam of rapidly diverging laser light.

The pendulous, positive lens 25 collimates the diverging laser light from the junction 23. The lens 25 also swings by gravity within the self-leveling range to shift and to position the optical elements of the lens exactly directly below the junction 23. The lens thereby directs the collimated light beam in a truly vertical direction.

The rotatable mirrors 27 deflect the vertically directed light beam substantially ninety degrees while swinging the deflected light beam in a horizontal plane (within the limits imposed by the rotating pentaprism or equivalent two mirror combination).

The light in this horizontal plane is detected by detectors mounted on targets or rods which are not shown in the drawings but which are known in the art.

The glass plate 29 can be tilted in two orthogonal degrees of adjustment to provide fine tuning control of the amount of offset of the light passing from the junction 23 to the positive lens 25.

In a specific embodiment of the present invention the solid state junction 23 is a diode and produces electromagnetic radiation which includes visible and infrared light. The diode itself is a sliver of material about two microns high by about ten or fifteen microns long so that it appears as a slit on the bottom surface of a housing 31 on which the diode is mounted.

In this particular embodiment of the invention, the diode produces about two to four milliwatts of light, and the light beams out in a cone-shaped configuration that has an angle of about ninety degrees in one dimension and about nine degrees in another dimension. The light is of a very high intensity and is diverging very rapidly.

The diode 23 itself is a commercially available item which may be bought from a number of different suppliers.

In a specific embodiment of the present invention the housing 31 is mounted on a thermoelectric cooler 33 which (as will be described in greater detail below) is energized in response to a certain sensed temperature of the housing 31. The cooler 33 cools the housing and the diode and prevents damage to the diode by diffusion resulting from operation at too high temperatures.

The housing 31 and thermoelectric cooler 33 are mounted on a mounting plate 35, and the lateral position of the mounting plate 35 can be adjusted to provide centering of the diode 23 with respect to the lens 25. The plate 35 is then clamped in the adjusted position by tightening screws 37. The plate 35 is held in a fixed position with respect to the main frame 13 by means of a subframe 39 connected to the main frame 13.

The positive lens 25, in a particular embodiment of the present invention, has an acceptance angle of about 35 degrees so that it accepts a little less than half of the cone of light emitted by the diode 23.

The lens 25 is mounted in a barrel or sleeve 41 having outer threads 43 which engage with inner threads 45 of a cylinder 47. The threads 43 and 45 permit the distance between the lens 25 and the diode 23 to be varied. In the operation of the level 11 the lens 25 is positioned (by rotating the barrel 41) at the focal length of the lens from the diode 23. This images the diode and emitted light at nearly infinity on the opposite, downward side of the lens 25 to substantially collimate the light beam passing from the positive lens 25.

The cylinder 47 is suspended to provide a pendulous mount for the lens 25 within the range of self-leveling of the level 11. The suspension for the cylinder 47 includes three fine wires 49. The lower end of each wire 49 is connected to the cylinder 47 by a clamping arm 51 while the upper end of each wire 49 is connected to the subframe 39 by a clamping arm 53.

As best shown in FIG. 2, the outer end of each clamping arm 51 is slotted, and a screw 55 is tightened to grip the wire 49 securely within the slot at a selected location on the wire.

Each clamping arm 53 is cantilevered from the subframe 39 and is attached to the subframe 39 by a capscrew 56.

Each lower clamping arm 51 has a construction similar to that of a related clamping arm 53 as described.

The lower end of the cylinder 47 is suspended a short distance above a related part of the main frame 13. The cantilevered arrangement of the clamping arms 53 and 51 acts as a spring to provide enough resiliancy, in the event of an axially occuring shock, to permit the cylinder 47 to bottom out against the part of the main frame 13 extending directly below the lower end of the cylinder 47 without producing enough stress on the fine wires 49 to break any of the wires.

The pendulous suspension provided by the fine wires 49 permits the cylinder 47 to shift laterally under the force of gravity (while maintaining the lens elements parallel to the diode) to provide self-leveling within a limited range in the event of a tilting of the main frame 13. That is, the pendulous suspension permits the lens 25 to swing back to a truly vertical position beneath the diode 23 in the event of a slight shifting or tilting of the level 11.

The range of self-leveling, in a specific embodiment of the present invention, it plus or minus ten minutes. The range is limited by the error allowed in the pentaprism.

It is an important feature of the present invention that the length of the wires 49 between the clamping arms 51 and 53 is enough greater than the focal distance between the diode 23 and the lens 25 to compensate for the modulus of the elasticity of the wires. The length of the wires is made longer than the focal distance by an amount sufficient to overcome the resistance of the bending of the wires and to permit the lens 25 to be moved by the force of gravity the exact amount required to maintain the lens in a true vertical position beneath the diode.

The range of self-leveling is limited by a second cylinder 57. This cylinder 57 encircles the major part of the length of the inner cylinder 47 and has an internal diameter somewhat greater than the external diameter of the cylinder 47 so that the inner cylinder 47 can swing a limited amount within the outer cylinder 57 to provide the self-leveling action described above. In one specific embodiment of the present invention the difference between the outside diameter of the cylinder 47 and the inside diameter of the cylinder 57 is 0.012 inch.

The inner cylinder 47 has a brass sleeve 59 which engages the inner surface of the cylinder 57 when the leveling required is greater than the self-leveling range provided for by the pendulous lens mount. The cylinder 57 is insulated from the frame 13 by insulation 61, and contact between the brass sleeve 59 and the cylinder 57 grounds a wire 63. The grounding of this wire 63 shuts off power to the diode 23, as will be described in greater detail below with reference to FIG. 3.

The present invention provides air damping of the movement of the inner cylinder 47 within the outer cylinder 57. Damping occurs as a result of the viscous drag that occurs when the air must be transferred from the diminishing space between the cylinder surfaces moving toward one another to the increasing space between the cylinder surfaces moving away from one another. While the relatively small space or gap between the two cylinders is open to the flow of air into and out of the gap at each of the ends of the gap, the internesting length of the two cylinders is long enough to provide significant enhancement of the damping action occuring within the air gap between the two cylinders. The damping occurs because of the resistance to squeezing the air out from between the surfaces that are being moved toward one another and also because of the resistance to inward flow of air between the surfaces of the cylinders which are moving apart. The air damping is effective in the level 11 of the present invention because of both the relatively small thickness of the gap between the inner cylinder 47 and outer cylinder 57 and also because of the extended length with which these two cylinders are internested.

In another embodiment of the present invention, a magnetic damping system is used in place of the air damping system described above.

As noted above, in the course of assembly of the level 11 the diode 23 is centered above the lens 25 before the diode is clamped into position by the screws 37. However, precise centering by mechanically positioning the diode 23 is difficult. The present invention provides a fine tuning adjustment for providing a controlled offset of the light beam emitted from the diode 23. This fine tuning adjustment comprises a glass plate 29 which is mounted on a carrier plate 71. The carrier plate 71 can be tilted in two orthogonal degrees of adjustment by adjustable screws 73 and 75 (see FIG. 2). A fixed screw 77 provides a fixed pivot or point of reference of the plate 71 with respect to the main frame 13. In a preferred embodiment, the plate 71 is formed with a series of slots 79 which coact with sheet metal strips (not shown) to provide guides which permit the tilting movements of the carrier plate 71 while preventing rotation of the plate 71.

Tilting the glass plate offsets the beam as it goes through the glass plate. The amount of offset is a function of the wave length of the light, the thickness of the glass plate, and the angle of the glass plate. The screws 73 and 75 permit very small changes to be made in the angle of tilt of the glass plate to provide a fine tuning adjustment for the offset of the beam and the effective centering of the diode 23 with respect to the lens 25.

A detector 81 is also mounted on the carrier plate 71 for detecting the intensity of the light output from the diode 23. This detector 81 is connected to a servo circuit which forms part of a power level control for controlling the power produced by the diode. The power level control prevents optical damage to the diode by limiting the current to the diode when operating temperatures are relatively low. The power level control will be described in greater detail below with reference to FIG. 3.

In a specific embodiment of the present invention, the mirror 27 is a two mirror combination which is equivalent to a pentaprism, but a pentaprism can also be used.

The mirror 27 is mounted in a housing 83 which is mounted for rotation within the main frame 13 by precision bearings 85. The bearing wobble should be small in comparison to the self leveling range.

A drive motor 87 rotates the housing 83 by intermeshing gears 89 and 91.

The vertical beam is deflected to a truly horizontal beam by the mirror 27 (within the limits imposed by the mirror 27) and the horizontal beam is swung through a horizontal plane while the horizontal beam passes through inclined windows 93. The windows 93 are inclined so that any reflected light is reflected at an angle such that it cannot interfere with the outwardly directed horizontal beam used for the reference plane.

It is another important feature of the present invention that the instrument 11 is constructed to provide a waterproof lighthouse enclosing all of the operating parts. This prevents inside condensation of moisture which could interfere with the optics of the instrument.

The lighthouse also incorporates a configuration and positioning of the panes 93 at their junctures with respect to posts 94 (see FIG. 1) for sweeping the beam past each post position throughout a full 360 degrees without loss of impingment, i.e., a blind spot, upon the remote target or beam detector. This construction is basically the same as that illustrated and described with reference to FIGS. 9-11 of the above noted U.S. Pat. No. 4,062,634 issued Dec. 13, 1977 to Rando, et al.

The electrical power for the instrument 11 is provided by a battery pack 95. The battery pack 95 is a relatively lightweight power pack, since no servo motors are required to provide the self-leveling action; and the battery pack 95 is a rechargeable battery pack. The self-contained, lightweight battery pack permits the instrument 11 to be handcarried by one person and operated in the field without auxiliary power or other equipment.

Figure 3:
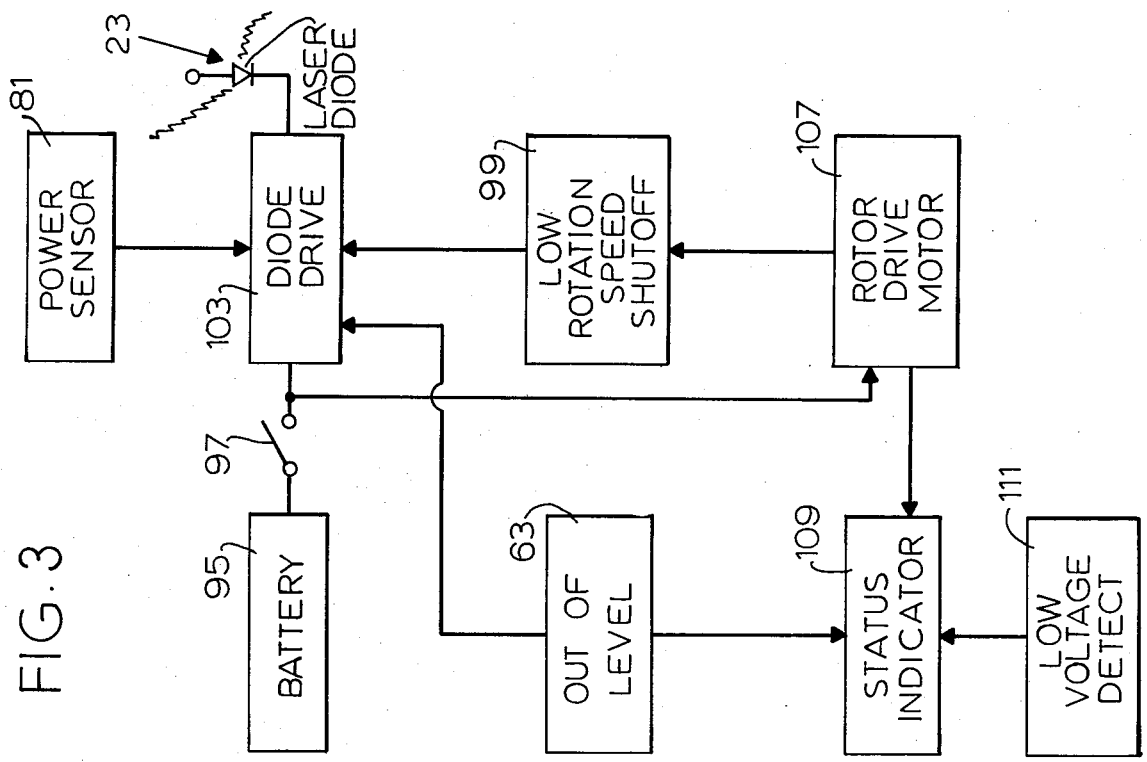
FIG. 3 is a block diagram of the electrical control system for the instrument shown in FIGS. 1 and 2.

An on-off switch 97 energizes the electrical circuitry shown in block diagram form in FIG. 3.

As illustrated in FIG. 3 there are a number of conditions which can shut off the power to the diode laser 23. These conditions include the out of level shut-off 63 (described above) when the inner cylinder 47 contacts the outer cylinder 57 as the instrument 11 is tilted out of its self-leveling range.

A low rotation speed shut-off 99 is also effective to shut off power to the diode laser 23 if the rotatable mirror 27 is not rotating at all or is not rotating fast enough to prevent the beam from exceeding laser safety requirements for power density.

The light output power sensor 81 described above is operatively associated with a power level control or diode drive 103 for decreasing the current to the laser diode 23 in the event the light output of the diode 23 exceeds a certain selected maximum.

A temperature sensor, thermoelectrical cooler and high temperature shut-off may be used with laser diode to prevent damage to the diode 23 by diffusion resulting from operation at too high a temperature, but these components are not always required and have therefore not been shown in FIG. 3.

The light output detector 81 and power level control 103 are effective to prevent optical damage to the diode 23 which could result from producing too much power at lower temperatures.

As illustrated in FIG. 3, the electrical circuitry also includes a rotor drive motor 107, a status indicator 109, and a low voltage detector 111.

It is believed that the operation of the laser beam level instrument 11 is clear from the description above. To summarize, the pendulous, positive lens 25 both collimates the rapidly diverging laser light from the diode 23 and directs the collimated light beam in a truly vertical downward direction to the rotatable mirror 27 which then deflects the beam ninety degrees and swings the deflected beam through a truly horizontal plane within the self-adjusting range of the level 11. The tiltable glass plate 29 provides fine tuning for a controlled lateral offset of the beam in two orthogonal directions for precise adjustment of the optical centering of the laser diode with respect to the lens 25.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A laser beam level instrument of the kind used in surveying and comprising,
    laser light generating means including a solid state light source for producing an intense beam of rapidly diverging laser light from the solid state light source, light from the light source and for directing the collimated light beam downwardly in a truly vertical direction, and
    rotatable mirror means for deflecting the vertically directed light beam substantially ninety degrees while swinging the deflected light in a horizontal plane.

2. The invention defined in claim 1 wherein the collimating means include a positive lens positioned below the light source at the focal length of the lens from the light source so as to image the emitted light at nearly infinity on the opposite side of the lens.

3. The invention defined in claim 2 including pendulous suspension which permit the positive lens to move under the force of gravity to a truly vertical position with respect to the light source in a limited self-leveling range.

4. The invention defined in claim 3 where the suspension means include a plurality of fine wires which suspend the positive lens in a pendulous mount below the light source and wherein the wires are enough longer than the focal distance between the lens and the light source to compensate for the resistance of the wires to bending so that the positive, pendulous lens shifts to a truly vertical position beneath the light source under the influence of gravity.

5. The invention defined in claim 4 wherein the positive lens is mounted in a focusing sleeve and including spring suspension means for the wires for permitting the wires to shift longitudinally a sufficient amount to permit the focusing sleeve to bottom out against the frame of the level upon occurance of an axial shock without breaking the fine wires.

6. The invention defined in claim 2 including fine tuning means for producing a controlled offset of the light passing from the light source to the positive lens.

7. The invention defined in claim 6 wherein the fine tuning means include a glass plate positioned between the light source and the positive lens, a carrier for the glass plate and adjustable screws for changing the tilt of the glass plate in two orthogonal degrees of adjustment.

8. The invention defined in claim 3 including damping means for damping the swinging movement of the pendulous, positive lens.

9. The invention defined in claim 8 wherein the damping means include a first, inner cylinder mounting the positive lens and a second, outer cylinder encircling the first cylinder with only a relatively small air-filled spaced between the opposed surfaces of the cylinders.

10. The invention defined in claim 9 wherein the length of the first cylinder enclosed within the second cylinder is long enough to provide significant enhancement of the damping action occuring within the air space between the two cylinders.

11. The invention defined in claim 10 wherein the distance between the inner and outer cylinder surfaces is in the range of 0.008 inches to 0.016 inches when the inner cylinder is centered within the outer cylinder.

12. The invention defined in claim 1 wherein the solid state light source is a diode which produces an intense beam of infrared laser light.

13. The invention defined in claim 1 wherein the rotatable mirror means comprise a two mirror combination constructed to operate like a pentaprism.

14. The invention defined in claim 12 including control means for controlling the energization of the diode.

15. The invention defined in claim 14 wherein the control means include power density limiting means for sensing the speed of rotation of the rotatable mirror means and for shutting off power to the diode when the speed of rotation is below a selected minimum.

16. The invention defined in claim 15 wherein the control means include detector means for detecting the amount of light emitted from the diode and a servo circuit operatively associated with the detector means and effective to reduce the current to the diode to prevent optical damage when the amount of light emitted by the diode exceeds a pre-selected maximum amount.

17. The invention defined in claim 15 including a housing mounting the diode and wherein the control means include temperature sensing means for sensing the temperature of the housing and effective to shut off power to the diode when the temperature of the housing exceeds a selected maximum.

18. The invention defined in claim 14 including self-contained, rechargable power pack means forming an integral part of the instrument.

19. The invention defined in claim 14 wherein the collimating means include a positive lens positioned below the diode and suspended by wires in a pendulous suspension which permits the positive lens to move under the force of gravity to a truly vertical position beneath the diode in a limited self-leveling range and wherein the control means include a switch operatively associated with the pendulous, positive lens and effective to shut off power to the diode when the pendulous, positive lens swings beyond the range of self-leveling.

20. The invention defined in claim 1 including a waterproof lighthouse enclosing all of the operating parts of the instrument.

21. A method of swinging a laser light beam through a truly horizontal plane so as to be useable in surveying and construction, said method comprising,
generating an intense beam of rapidly diverging laser light from a solid state light source,
collimating the diverging light by a positive lens positioned at the focal length of the lens from the light source so as to substantially image the emitted light at infinity on the opposite side of the lens,
suspending the positive lens below the light source in a pendulous mount which permits the collimated light beam to be directed downward in a truly vertical direction within a limited range of self-leveling, and
deflecting the vertically downwardly directed light beam substantially 90 degrees while swinging the deflecting light beam in a truly horizontal plane.

* * * * *

UNITED STATES PATENT OFFICE
CERTIFICATE OF CORRECTION

Patent No. 4,221,483       Dated September 9, 1980

Inventor(s) Joseph F. Rando

It is certified that error appears in the above-identified patent and that said Letters Patent are hereby corrected as shown below:

In the Abstract, first line of the third paragraph, "The postiive" should read -- The positive --.

Column 5, line 18, "invention, it" should read -- invention, is --.

Column 8, line 6, "source, light from" should read
-- source,
    collimating means for collimating the diverging laser light from --.

Signed and Sealed this

Eighteenth Day of November 1980

[SEAL]

Attest:

SIDNEY A. DIAMOND

Attesting Officer       Commissioner of Patents and Trademarks

REEXAMINATION CERTIFICATE (1527th)
United States Patent [19]
Rando

[11] B1 4,221,483
[45] Certificate Issued  Aug. 13, 1991

[54] LASER BEAM LEVEL INSTRUMENT

[75] Inventor: Joseph F. Rando, Cupertino, Calif.

[73] Assignee: Spectra-Physics, Inc.

Reexamination Request:
No. 90/001,994, Apr. 10, 1990

Reexamination Certificate for:
Patent No.: 4,221,483
Issued: Sep. 9, 1980
Appl. No.: 962,198
Filed: Nov. 20, 1978

Certificate of Correction issued Sep. 9, 1980.

[51] Int. Cl.$^5$ .............................................. G01C 9/12
[52] U.S. Cl. .................................... 356/250; 356/149

[56] References Cited
U.S. PATENT DOCUMENTS

| | | | |
|---|---|---|---|
| 3,771,876 | 11/1973 | Ljungdahl | 356/138 |
| 3,936,197 | 2/1976 | Aldrink | 356/250 |
| 3,973,852 | 8/1976 | Moore et al. | 250/552 X |
| 4,036,557 | 7/1977 | Christensen | 356/369 X |
| 4,062,634 | 12/1977 | Rando | 356/248 |
| 4,113,381 | 9/1978 | Epstein | 356/5 |

OTHER PUBLICATIONS

"The Promising Light from Semiconductor Lasers," *Business Week*, Sep. 15, 1975, p. 86.
"Electronic Total Station Speeds Survey Operations," by M. L. Bullock & R. E. Warren, *Hewlett Packard Journal*, vol. 27, No. 8, Apr. 1976, pp. 2-12.

*Primary Examiner*—Davis L. Willis

[57] ABSTRACT

A lightweight, portable laser beam level instrument has an optical path which includes a solid state light source; a pendulous, positive lens; a rotatable pentaprism or mirror equivalent; and a glass plate which is tilted to provide fine tuning. The level instrument also includes a damping mechanism, a waterproof enclosure and a clip-in battery pack.

The solid state light source is a diode in a specific embodiment and produces an intense beam of rapidly diverging infrared laser light.

The positive lens is suspended below the diode at approximately the focal length of the lens from the diode to collimate the light. The pendulous suspension lens maintains the beam in a truly vertical position with respect to the earth to provide self-leveling in a limited range of movement of the instrument. The pentaprism or equivalent converts this vertical beam to a horizontal beam.

The glass plate is positioned between the diode and the lens and can be tilted in two orthogonal degrees of adjustment to provide a fine tuning for optical centering of the diode and the lens.

Oscillation of the pendulous lens is damped by magnetic or air damping.

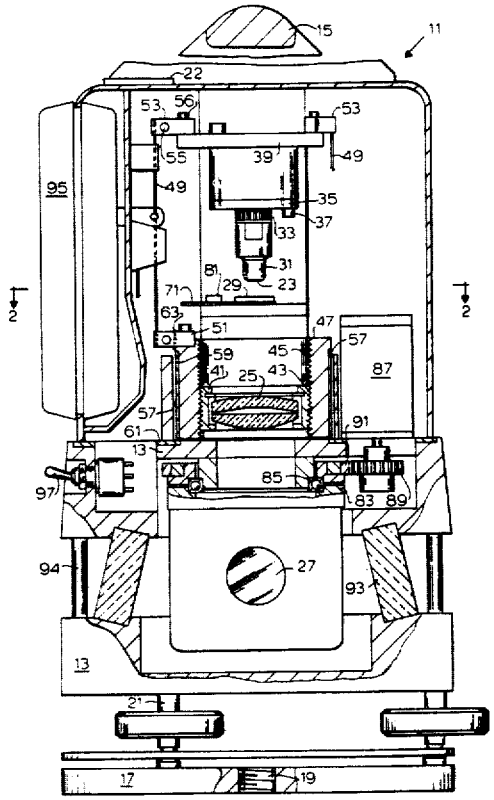

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-21 is confirmed.

New claims 22-28 are added and determined to be patentable.

*22. A laser beam level instrument of the kind used in surveying and comprising,*

*laser light generating means including a solid state light source for producing an intense beam of rapidly diverging laser light from the solid state light source,*

*collimating means for collimating the diverging laser light from the light source and for directing the collimated light beam downwardly in a truly vertical direction,*

*centering means for optically centering the laser light on a center of said collimating means, and*

*rotatable mirror means for deflecting the vertically directed light beam substantially ninety degrees while swinging the deflected light in a horizontal plane.*

*23. The invention defined in claim 22, wherein said collimating means is comprised of at least one lens.*

*24. The invention defined in claim 22, or 23, wherein the centering means maintains energy of the deflected light in a plane which is truly horizontal.*

*25. A laser beam level instrument of the kind used in surveying and comprising,*

*laser light generating means including a solid state light source for producing an intense beam of rapidly diverging laser light from the solid state light source,*

*collimating means for collimating the diverging laser light from the light source and for directing the collimated light beam downwardly in a truly vertical direction,*

*rotatable mirror means for deflecting the vertically directed light beam substantially ninety degrees while swinging the deflected light in a horizontal plane; and*

*centering means for optically centering the laser light in relation to said rotatable mirror means.*

*26. The invention claimed in claim 25 wherein the centering means maintains energy of the deflected light in a plane which is truly horizontal.*

*27. The method of claim 21, further comprising, centering said laser light relative to a center of rotation of rotatable mirror means.*

*28. The method of claim 21, further comprising centering said laser light relative to a center of said positive lens.*

* * * * *